(12) United States Patent
Iyer et al.

(10) Patent No.: US 8,599,787 B2
(45) Date of Patent: *Dec. 3, 2013

(54) ROUTING PACKET FLOWS ALONG AN OPTIMIZED PATH IN AN IMS NETWORK

(75) Inventors: Jayaraman R. Iyer, Sunnyvale, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 638 days.

This patent is subject to a terminal disclaimer.

(21) Appl. No.: 11/428,439

(22) Filed: Jul. 3, 2006

(65) Prior Publication Data

US 2008/0002661 A1   Jan. 3, 2008

(51) Int. Cl.
*H04W 4/00* (2009.01)
*H04L 12/28* (2006.01)

(52) U.S. Cl.
USPC .......................................... 370/331; 370/351

(58) Field of Classification Search
USPC .......... 370/230, 328, 401, 331, 351; 455/433, 455/411; 709/238, 227, 225
See application file for complete search history.

(56) References Cited

U.S. PATENT DOCUMENTS

| | | | | |
|---|---|---|---|---|
| 5,408,419 A | * | 4/1995 | Wong | 709/225 |
| 6,816,912 B1 | * | 11/2004 | Borella et al. | 709/238 |
| 6,987,771 B2 | | 1/2006 | Shimizu et al. | 370/401 |
| 7,551,915 B1 | * | 6/2009 | Manning et al. | 455/411 |
| 2003/0088675 A1 | * | 5/2003 | Zheng | 709/227 |
| 2003/0176188 A1 | * | 9/2003 | O'Neill | 455/433 |
| 2005/0041650 A1 | | 2/2005 | O'Neill | 370/355 |
| 2006/0250956 A1 | * | 11/2006 | Alfano et al. | 370/230 |
| 2007/0189309 A1 | * | 8/2007 | Bosch et al. | 370/401 |
| 2007/0195791 A1 | | 8/2007 | Bosch et al. | |
| 2007/0202873 A1 | | 8/2007 | Yegani et al. | 455/433 |
| 2008/0002661 A1 | | 1/2008 | Iyer et al. | 370/351 |
| 2008/0002662 A1 | * | 1/2008 | Grayson et al. | 370/351 |
| 2008/0316956 A1 | * | 12/2008 | Turanyi et al. | 370/328 |

OTHER PUBLICATIONS

United States Patent and Trademark Office, Office Action dated Jan. 9, 2009 for U.S. Appl. No. 11/428,449, filed Jul. 3, 2006 in the name of Mark Grayson; 27 pages.
United States Patent and Trademark Office, Office Action dated Sep. 4, 2009 for U.S. Appl. No. 11/428,449, filed Jul. 3, 2006 in the name of Mark Grayson, 38 pages.
"*Draft Report of SA2 meeting #48, Version 1.0.0*", 3GPP TSG SA WG2 Architecture—S2#48, pp. 1-53, Sep. 5-9, 2005.

(Continued)

*Primary Examiner* — Mark Rinehart
*Assistant Examiner* — Gbemileke Onamuti
(74) *Attorney, Agent, or Firm* — Baker Botts L.L.P.

(57) ABSTRACT

Routing a packet flow in a communication session includes facilitating a communication session between a first endpoint and a second endpoint. A permanent anchor of a home network receives path offers sent by the first endpoint. An optimized path offer corresponds to an optimized path passing through a transient anchor of a visited network and bypassing the permanent anchor. A default path offer corresponds to a default path passing through the permanent anchor. The permanent anchor determines whether packet flows between the first endpoint and the second endpoint are to be routed along the optimized path. The default path offer is removed if the packet flows are to be routed along the optimized path. The optimized path offer is removed if not. The remaining path offer is forwarded to the second endpoint.

14 Claims, 3 Drawing Sheets

(56) References Cited

OTHER PUBLICATIONS

Patent Application entitled, "*Routing Packet Flows Along an Optimized Path*", 31 pages specification, claims and abstract, 3 pages of drawings, inventors Mark (nmi) Grayson et al., Jul. 3, 2006.

United States Patent and Trademark Office, Office Action dated Apr. 24, 2009 for U.S. Appl. No. 11/428,449, filed Jul. 3, 2006 in the name of Mark Grayson, 36 pages.

United States Patent and Trademark Office, Office Action dated Feb. 1, 2010 for U.S. Appl. No. 11/428,449, filed Jul. 3, 2006 in the name of Mark Grayson, 43 pages.

United States Patent and Trademark Office, Office Action dated May 28, 2010 for U.S. Appl. No. 11/428,449, filed Jul. 3, 2006 in the name of Mark Grayson, 21 pages.

United States Patent and Trademark Office, Final Office Action dated Nov. 10, 2010 for U.S. Appl. No. 11/428,449, filed Jul. 3, 2006 in the name of Mark Grayson, 23 pages.

U.S. Patent and Trademark Office Official Action dated Apr. 11, 2013 in U.S. Appl. No. 11/428,449, 16 pages.

\* cited by examiner

US 8,599,787 B2

ROUTING PACKET FLOWS ALONG AN OPTIMIZED PATH IN AN IMS NETWORK

TECHNICAL FIELD

This invention relates generally to the field of telecommunications and more specifically to routing packet flows along an optimized path in an IMS network.

BACKGROUND

An endpoint such as a mobile node may use a system of communication networks to communicate packet flows with other endpoints. For example, a mobile node may subscribe to a home network that maintains subscription information for the mobile node. If the mobile node is outside of the range of the home network, the mobile node may use a visited network to communicate packet flows.

Certain known techniques may be used to route packet flows between endpoints and through networks. These known techniques, however, are not efficient in certain situations. In certain situations, it is generally desirable to be efficient.

OVERVIEW OF THE DISCLOSURE

In accordance with the present invention, disadvantages and problems associated with previous techniques for routing packet flows may be reduced or eliminated.

According to one embodiment of the present invention, routing a packet flow in a communication session includes facilitating a communication session between a first endpoint and a second endpoint. A permanent anchor of a home network receives path offers sent by the first endpoint. The path offers comprise an optimized path offer and a default path offer. The optimized path offer corresponds to an optimized path passing through a transient anchor of a visited network and bypassing the permanent anchor. The default path offer corresponds to a default path passing through the permanent anchor. An application server of the home network determines whether one or more packet flows between the first endpoint and the second endpoint are to be routed along the optimized path. The default path offer is removed if the one or more packet flows are to be routed along the optimized path. The optimized path offer is removed if the one or more packet flows are not to be routed along the optimized path. The remaining path offer is forwarded to the second endpoint.

Certain embodiments of the invention may provide one or more technical advantages. A technical advantage of one embodiment may be that a transient anchor of a visited network may send a packet flow along an optimized path, which may reduce latency between endpoints.

Another technical advantage of one embodiment may be that a home policy server of the home network may provide policy rules to a visited policy server of the visited network. The policy rules may be used to select packet flows to send along the optimized path.

Another technical advantage of one embodiment may be that the transient anchor may send usage information to the home network of the endpoint. The home network may apply charging rules to the usage information.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
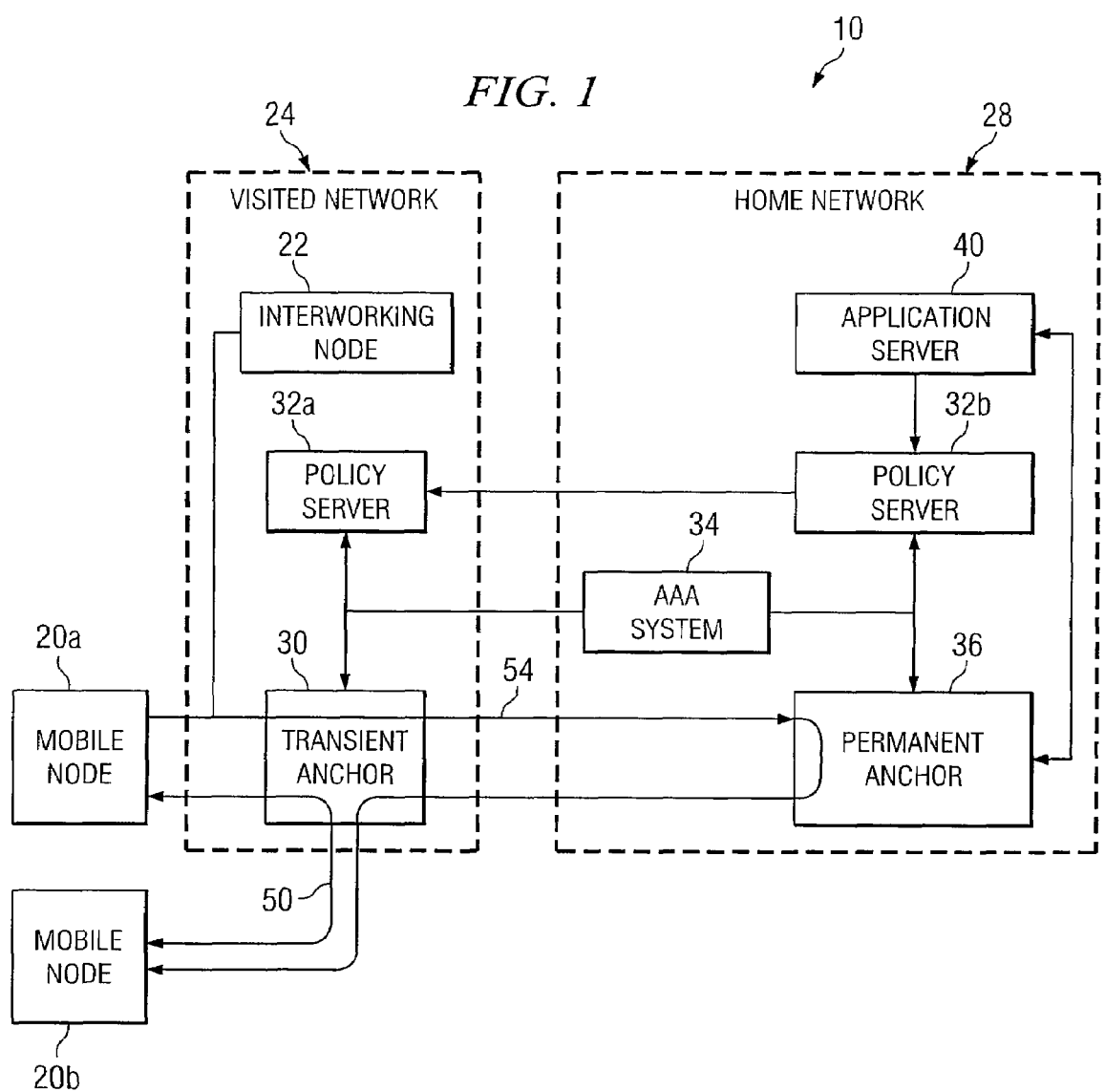
FIG. 1 is a block diagram of one embodiment of a system in which packet flows may be routed.
Figure 2:
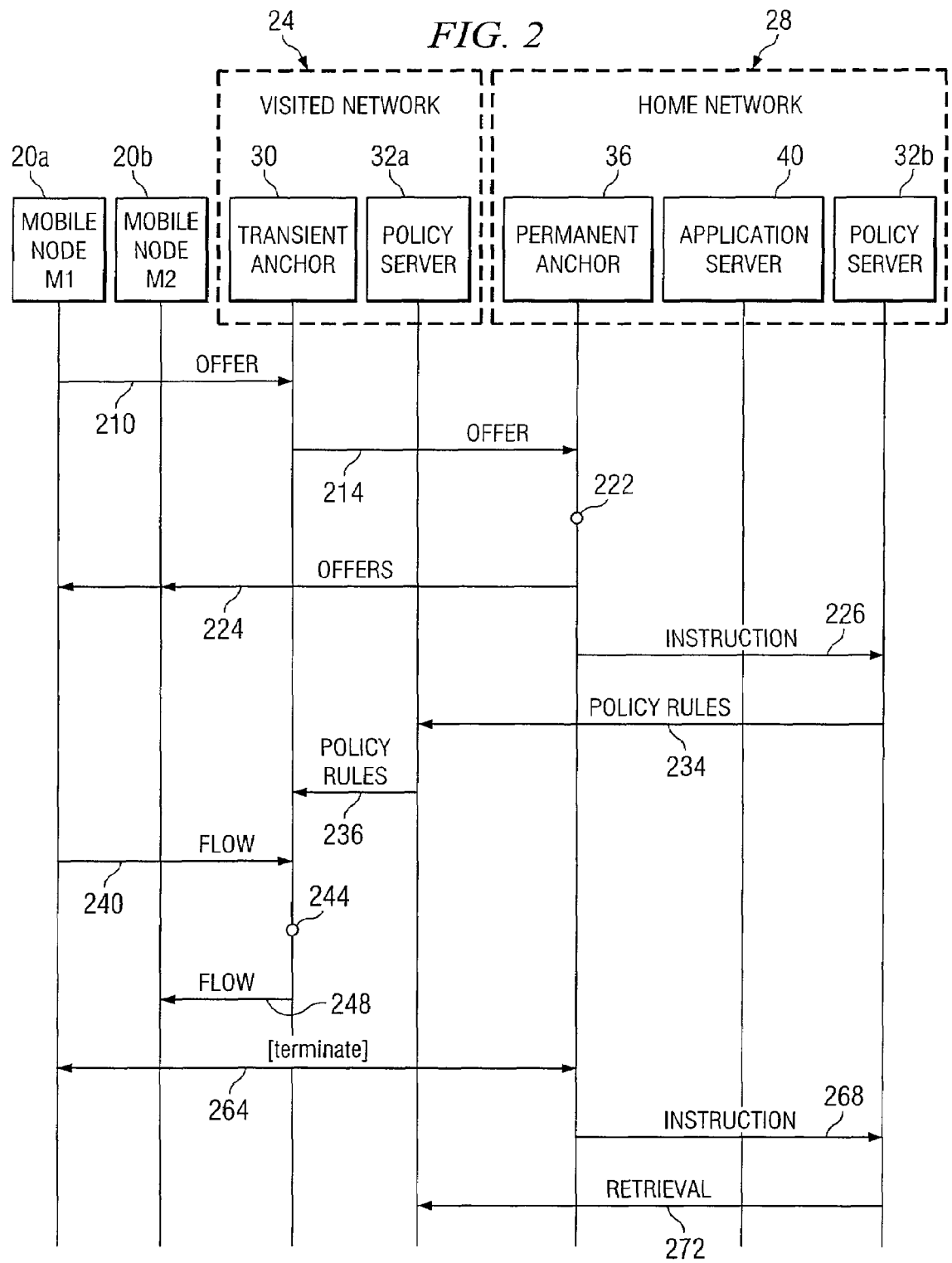
FIG. 2 is a call flow diagram illustrating one embodiment of a method for routing packet flows that may be used with the system of FIG. 1.
Figure 3:
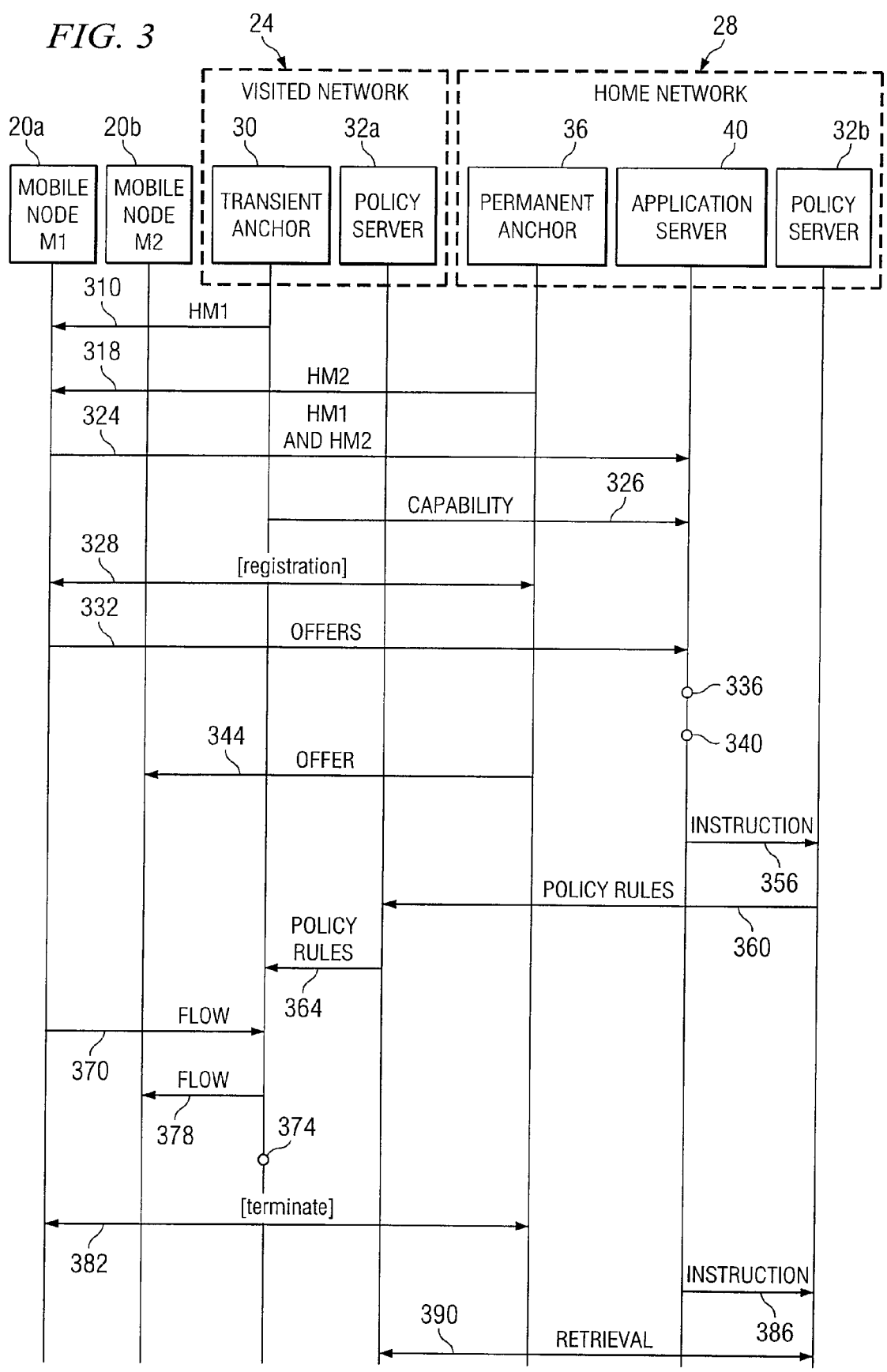
FIG. 3 is a call flow diagram illustrating another embodiment of a method for routing packet flows that may be used with the system of FIG. 1.

Embodiments of the present invention and its advantages are best understood by referring to FIGS. 1 through 3 of the drawings, like numerals being used for like and corresponding parts of the various drawings.

FIG. 1 is a block diagram of one embodiment of a system in which packet flows may be routed. According to the embodiment, certain packet flows may be routed through a transient anchor of a visited network, but not through a permanent anchor of a home network. The transient anchor may send a packet flow along an optimized path, which may reduce latency between endpoints.

According to the embodiment, a home policy server of the home network may provide policy rules regarding services for an endpoint of the home network. The policy rules may be used to establish whether packet flows are to be sent along the optimized path. The home policy server may inform a visited policy server of the visited network about the flows to be sent along the optimized path. The transient anchor may also send usage information to the home network of the endpoint. The home network may apply charging rules to the usage information.

According to the illustrated embodiment, system 10 operates to provide services such as communication sessions between endpoints such as mobile nodes 20 or between a mobile node 20 and an interworking node 22. A communication session may refer to an active communication between endpoints, measured from endpoint to endpoint. Information is communicated during a communication session. Information may refer to voice, data, text, audio, video, multimedia, control, signaling, other information, or any combination of the preceding.

System 10 may communicate information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

A packet flow may be identified in any suitable manner. As an example, a packet flow may be identified by a packet identifier giving the source and destination of the packet flow. A source may be given by an address such as the IP address, port, or both. Similarly, a destination may be given by an address such as the IP address, port, or both.

System 10 may utilize communication protocols and technologies to provide communication sessions. Example communication protocols and technologies include those described by the Institute of Electrical and Electronics Engineers, Inc. (IEEE) 802.xx standards such as 802.11, 802.16, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

System 10 includes communication networks. In general, a communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. As an example, a communication network may comprise a public land mobile network (PLMN).

System 10 includes components such as devices. In general, a device may include any suitable arrangement of components operable to perform the operations of the device. As an example, one or more components of system 10 may include logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable logic operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes mobile nodes 20, a visited network 24, and a home network 28 coupled as shown. Visited network 24 includes a transient anchor 30, a policy server 32a, and an interworking node 22. Home network 28 includes an authentication, authorization, and/or accounting (AAA) system 34, a permanent anchor 36, a policy server 32b, and one or more application servers 40. According to the illustrated embodiment, transient anchor 30 may route a packet flow along an optimized path 50 or a default path 54 according to a policy rule.

According to one embodiment, a mobile node 20 represents any suitable device operable to communicate with a communication system. Mobile node 20 may comprise, for example, a personal digital assistant, a computer such as a laptop, a cellular telephone, a mobile handset, or any other device operable to communicate with system 10.

Visited network 24 represents a communication network that facilitates a communication session for mobile node 20a within the range of visited network 24, and may be accessed through a radio access network. Visited network 24 may include a foreign agent that provides mobile node 20a with an address to which flows for mobile node 20a may be forwarded. Visited network 24 may include a proxy mobile IP node that registers with permanent anchor 36 and provides mobile node 20a with an address to which flows for mobile node 20a may be forwarded.

In general, an anchor processes signaling in communications session. Transient anchor 30 processes signaling from mobile node 20a while mobile node 20a is being served by visited network 24. Transient anchor 30 may comprise any suitable device, for example, a Serving General Packet Radio Services (GPRS) Support Node (SGSN) or a mobile IPv6 node or a Packet Data Serving Node (PDSN). Transient anchor 30 may also commit resources and maintain gateways for packet flows in visited network 24. These operations may be performed according to any suitable technique, for example, an IP Multimedia Subsystem (IMS) technique.

According to one embodiment, transient anchor 30 may perform optimized routing. That is, transient anchor 30 may route a packet flow along an optimized path 50 through transient anchor 30 or a default path 54 through transient anchor 30 and permanent anchor 36 according to a policy rule. Transient anchor 30 may configure a path for selected flows through a gateway of visited network 24 to route the flows along optimized path 50.

According to one embodiment, transient anchor 30 may track usage of visited network 24 by mobile node 20a and may provide this usage information to home network 28. Optimized routing may be performed in any suitable manner. Examples of methods for routing packet flows are described in more detail with reference to FIGS. 2 and 3.

A policy server 32 manages policy rules and provides the policy rules to an anchor 30 or 36. Policy server 32 may communicate with an application server 40 that requests policy to be implemented on its behalf for a particular user. Policy server 32 may communicate with AAA system 34 for authorizing policy requests coming from application server 40. According to the illustrated embodiment, policy server 32a provides policy rules to transient anchor 30, and policy server 32b provides policy rules to permanent anchor 36. Policy server 32a may receive policy rules from policy server 32b of home network 28.

In general, a rule may specify an action to be taken if a trigger event occurs, and may be subject to a condition. Policy rules may include routing rules, charging rules, quality of service rules, usage tracking rules, other suitable rules, or any combination of the preceding, and may be associated with a particular flow. A routing rule may specify how to route a packet flow. For example, an optimized routing rule may specify a packet flow that is to be routed on optimized path 50 or default path 54 based on the type of packet flow. For example, a rule may specify that if packet flow has a particular path identifier, then the packet flow to be routed along optimized path 50. Otherwise, the packet flow is to be routed along default path 54.

Any suitable optimized routing rule may be used. As a first example, an optimized routing rule may specify that if the mobile nodes 20 engaged in a real-time communication session are being serviced by the same visited network 24, then use optimized path 50. As a second example, an optimized routing rule may specify that if there is not an appropriate relationship between visited network 24 and home network 28, then use default path 54. As a third example, an optimized routing rule may specify that if high security that can only be provided by home network 28 is required, then use default path 54.

A charging rule may specify how to charge an account. As a first example, a charging rule may specify that if there is a certain amount of usage, then the account is to be charged a predetermined amount. As a second example, a charging rule may specify that account is to be charged at a zero rate. As a third example, a charging rule may specify that a charging server should be contacted for a quote or request. As a fourth example, a charging rule may specify a charging identifier used to identify an account of mobile node 20a.

A quality of service rule may specify how packet flows should be handled based on their quality of service. A usage tracking rule may specify how to measure usage of a network by mobile node 20a. Usage may be measured using any suitable parameters, for example, duration of a communication session, duration of the subscription, amount of packets communicated, other parameter, or any combination of the preceding.

Home network 28 represents a communication network that maintains a subscription for mobile node 20a. The subscription may include an account that is charged based upon usage by mobile node 20a. AAA system 34 provides services for authentication, authorization, accounting, or any suitable combination of the preceding. AAA system 34 may process signaling from permanent anchor 36 and transient anchor 30 in order to authenticate a user and authorize usage.

AAA system 34 may maintain subscription information such as subscriber information. Subscriber information may include one or more identifiers for the subscription. As an example, the identifiers may include an account identifier that uniquely identifies the account associated with the subscription. The account identifier may be used to charge the account based upon usage by mobile node 20a.

Permanent anchor 36 processes signaling from mobile node 20a, and may maintain the address of mobile node 20a and forward packets to mobile node 20a.

Application server 40 processes application level signaling from mobile node 20a, and may forward signaling messages to mobile node 20b. According to one embodiment, application messages from mobile node 20a to mobile node 20b may traverse application server 40 serving mobile node 20a and another application server serving mobile node 20b.

According to one embodiment, application server 40 may establish whether transient anchor 30 supports optimized routing, and may do so using AAA system 34. Application server 40 may use the application signaling sent from mobile node 20a to influence whether a packet flow follows optimized path 50 or default path 54 according to a policy rule. Application server 40 may communicate a request to install a routing policy application, and may do so by communicating with policy server 32b.

Policy server 32b may determine that a request for policy is associated with optimized routing by communicating with permanent anchor 36. If transient anchor 30 supports optimized routing and mobile node 20a is authorized by AAA system 34 to receive optimized routing service, policy server 32b may notify policy server 32a of packet flows that may be optimized along optimized path 50. Policy server 32a may notify transient anchor 30 of the packet flows that may be routed along optimized path 50.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic comprising software, hardware, other logic, or any suitable combination of the preceding. As used in this document, "each" refers to each member of a set or each member of a subset of a set.

FIG. 2 is a call flow diagram illustrating one embodiment of a method for routing packet flows that may be used with system 10 of FIG. 1. According to the illustrated embodiment, mobile nodes 20a and 20b have identifiers M1 and M2, respectively. Mobile node M1 has M1 home network 28 and is visiting M1 visited network 24. Mobile node M1 is engaged in a communication session with mobile node M2, which has its own M2 home network, M2 permanent anchor, M2 visited network, and M2 transient anchor. M1 transient anchor and M2 transient anchor may have a secured communication link. For example, M1 and M2 transient anchors may have a shared key.

Steps 210 through 224 describe a media negotiation process to negotiate paths, for example, optimized path 50 or default path 54, on which to communicate media packet flows. The negotiation process may be conducted according to any suitable procedure, for example, a Session Description Protocol (SDP) offer/answer procedure using Session Initiation Protocol (SIP) signaling. As an example, an offer may indicate the types of media packet flows that may be sent by a sender, and a response may indicate types of media flows supported by the receiver and the paths over which the packet flows may be sent.

Mobile node M1 sends an offer to mobile node M2 through M1 transient anchor 30 of M1 visited network 30 at step 210. M1 transient anchor may insert information into the offer and forward the offer to permanent anchor 36 of M1 home network 28 at step 214. The information may inform M1 permanent anchor 36 of the care-of address of M1 transient anchor, the policy server associated with M1 transient anchor, and the capability of M1 visited network 24 to perform optimized routing.

M1 permanent anchor 36 establishes that optimized routing may be used according to an optimized routing rule at step 222. The determination may be made based on the optimized routing capability of M1 visited network 24, policy rules, subscriber authorization status, other factor, or any suitable combination of the preceding.

M1 permanent anchor 36 forwards the offer from mobile node M1 to mobile node M2 at step 224. The offer may be routed through M2 permanent node, which maintains the address of mobile node M2. M2 permanent node forwards the offer to mobile node M2 through M2 transient anchor. Mobile node M2 replies to the offer with an answer, which may be routed through M2 transient anchor, M1 permanent anchor, and M1 transient anchor.

M1 permanent anchor 36 instructs policy server 32b of M1 home network 28 to send policy rules to policy server 32a of visited network 24 at step 226. The policy rules may include routing rules and usage tracking rules. The routing rules may include an optimized routing rule that specifies packet flows to be routed along optimized path 50. A packet flow may be specified using a packet flow identifier given by the source and destination of the packet flow. For example, the optimized routing rule may specify that packet flows with an identifier given by mobile node M1 as the source and mobile node M2 as the destination and packet flows with an identifier given by mobile node M2 as the source and mobile node M2 as the destination should be routed along optimized path 50.

Policy server 32b provides the policy rules to policy server 32a at step 234. Policy server 32b may provide the policy rules in any suitable manner. For example, policy server 32b may discover policy server 32a using policy proxy discovery procedures. The rules may then be pushed to transient anchor 30 in visited network 24 that is supporting mobile node M1. The policy rules are provided to transient anchor 30 at step 236.

According to one embodiment, M1 transient anchor 30 establishes communication with M2 transient anchor. M1 transient anchor 30 may utilize proxy mobile node functionality to send a binding update message detailing the flows to be optimized to M2 transient anchor. If M2 transient anchor has been authorized to optimize routing, M2 transient anchor responds with a binding acknowledgment. Otherwise, the binding fails and routing is not optimized.

Mobile node M1 sends a packet flow for mobile node M2 to transient anchor 30 at step 240. Transient anchor 30 determines that the packet flow is to be routed along optimized path 50 at step 244. The determination may be made according to the optimized routing rule. Transient anchor 30 sends the packet flow to mobile node M2 instead of to permanent anchor 36 at step 248 to route the packet flow along optimized path 50.

The communication session terminates at step 264. M1 permanent anchor 36 instructs policy server 32b to retrieve the policy rules from policy server 32b at step 268. Policy server 32b retrieves the policy rules at step 272. After retrieving the rules, the method terminates.

Use of this method may be detected by analyzing the protocol used to manage roaming. Use of the method may also be detected by analyzing the protocol exchange between transient anchors 30.

Modifications, additions, or omissions may be made to the method without departing from the scope of the invention. The method may include more, fewer, or other steps. Additionally, steps may be performed in any suitable order without departing from the scope of the invention.

FIG. 3 is a call flow diagram illustrating another embodiment of a method for routing packet flows that may be used with system 10 of FIG. 1. According to the illustrated embodiment, mobile nodes 20a and 20b have identifiers M1 and M2, respectively. Mobile node M1 has M1 home network 28 and is visiting M1 visited network 24. Mobile node M1 is engaged in a communication session with mobile node M2, and has its own M2 home network, M2 permanent anchor, M2 visited network, and M2 transient anchor.

Mobile node M1 receives a visitor IP address VM1 assigned by M1 visited network 124 at step 310, and receives a home IP address HM1 assigned by M1 home network 128 at step 318. Mobile node M1 may also recover the address of an M1 proxy call session control function (P-CSCF) of M1 home network 28. Mobile node M2 receives a visitor IP address VM2 assigned by M2 visited network, and receives a home IP address HM2 assigned by M2 home network.

Mobile node M1 informs M1 home network 28 of the assigned IP addresses at step 324. M1 transient anchor 30 informs M1 home network 28 of the capability of M1 visited network 24 to perform optimized routing at step 326. The IP addresses and capability information may be sent in any suitable manner, for example, in an accounting start message. The IP addresses may be included as framed IP addresses. The accounting start message may be proxied using authentication, authorization, and/or accounting (AAA) techniques towards AAA system 34 of home network 28.

Mobile node M1 registers with M1 home network 28 at step 328. The registration may be performed in any suitable manner. As an example, mobile node M1 may register with an M1 serving call session control function (S-CSCF). The M1 S-SCSF may obtain information from AAA system 34 describing the assigned IP addresses and the optimized routing capability of M1 visited network 24. The indication may be made in any suitable manner, for example, using diameter attribute value pairs in an authentication response. The M1 S-CSCF may provide mobile node M1 an indication that M1 visited network and M1 subscription stored in AAA system 34 both support optimized routing. The indication may be provided using a P-header in a 200 OK register message.

Steps 332 through 344 describe a media negotiation process to negotiate paths, for example, optimized path 50 or default path 54, on which to communicate media packet flows. The negotiation process may be conducted according to any suitable procedure. Mobile node M1 sends offers representing optimized path 50 and default path 54 at step 332. An optimized path offer representing optimized path 50 may include the visited IP address VM1, and a default path offer representing default path 54 may include the home IP address HM1. Mobile node 20a sends the offers to M1 S-CSCF. The offers are routed through M1 transient anchor 30, M1 permanent anchor 36, M1 P-CSCF, and M1 S-CSCF. The M1 P-CSCF caches the source addresses of the offers.

M1 home network 28 establishes whether optimized routing should be performed at step 336. The determination may be made based on the optimized routing capability of M1 visited network 24, policy rules, other factor, or any suitable combination of the preceding. The determination may be made by any suitable device of home network 28, for example, the S-SCSF and/or the Service Capability Interaction Manager (SCIM). The S-SCSF and/or SCIM may also confirm that the offers are associated with the appropriate addresses.

A path is selected by removing one of the offers at step 340. If optimized routing of the originating leg is to be performed, the default path offer may be removed. If optimized routing is not to be performed, the optimized path offer may be removed. The M1 S-CSCF then routes the offer to mobile node M2, through the M2 S-CSCF, M2 permanent anchor, and M2 transient anchor at step 344.

Mobile node M2 performs similarly to mobile node M1. If mobile node M2 has been notified that M2 home network supports optimal routing, the reply includes two answers, one corresponding to visited IP address VM2 and one corresponding to home IP address HM2. The M2 S-CSCF determines whether optimized routing of the terminating leg should be performed on behalf of mobile node M2 according to similar factors to those used by M1 S-CSCF. A path may be selected by removing one of the answers. If optimized routing of the terminating leg is to be performed, the default path answer may be removed. If optimized routing is not to be performed, the optimized path answer may be removed. The M2 S-CSCF then routes the answer back to mobile node M1, via the M1 S-CSCF, M1 permanent anchor 36, and M1 transient anchor 30.

The M1 P-CSCF acting as an application server 40 instructs policy server 32b of M1 home network 28 to send policy rules to policy server 32b of visited network 24 at step 356. The instruction may be performed in any suitable manner. For example, M1 P-CSCF application server 28 may send the SIP message source address and the SDP offer source address to policy server 32b. The SIP message source address includes the home IP address HM1. The SDP offer source address includes the visited IP address VM1 if optimized routing is being performed, and the home IP address HM1 if default routing is being performed. That is, the addresses match if optimized routing is being used, and the addresses do not match if default routing is being used.

Policy server 32b compares the SIP message source address and the SDP offer source address to determine if optimized or default routing is being used. If optimized routing is being used, policy server 32a of visited network 24 may be used to implement policy rules.

Policy server 32b provides the policy rules to transient anchor 30 in visited network 24 at steps 360 and 364. Transient anchor 30 installs a rule that enables optimal routing of packets matching the policy rule. Policy server 32b may provide the policy rules in any suitable manner, for example, as described with reference to FIG. 2.

Mobile node M1 sends a packet flow for mobile node M2 to transient anchor 30 at step 370. Transient anchor 30 determines that the packet flow is to be routed along optimized path 50 at step 374. The determination may be made according to the optimized routing rule. Transient anchor 30 sends the packet flow to mobile node M2 instead of to permanent anchor 36 at step 378 to route the packet flow along optimized path 50.

The communication session terminates at step 382. M1 permanent anchor 36 instructs policy server 32b to retrieve the policy rules from policy server 32b at step 386. Policy server 32b retrieves the policy rules at step 390. After retrieving the rules, the method terminates.

Use of this method may be detected by analyzing the protocol used to manage roaming. Use of the method may also be detected by reviewing service activation and session description protocol (SDP) communication between visited network 24 and home network 28.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a transient anchor of a visited network may send a packet flow along an optimized path, which may reduce latency between endpoints.

Another technical advantage of one embodiment may be that a home policy server of the home network may provide policy rules to a visited policy server of the visited network. The policy rules may be used to select packet flows to send along the optimized path.

Another technical advantage of one embodiment may be that the transient anchor may send usage information to a permanent anchor of the home network of the mobile node. The permanent anchor may apply charging rules to the usage information.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for routing a packet flow in a communication session, comprising:
   facilitating a communication session between a first endpoint and a second endpoint;
   receiving a plurality of path offers for one or more packet flows in one or more packets at an application server of a home network, the plurality of path offers sent by the first endpoint, the plurality of path offers comprising an optimized path offer and a default path offer, the optimized path offer comprising an offer to use an optimized path for the one or more packet flows passing through a transient anchor of a visited network and bypassing a permanent anchor, the default path offer comprising an offer to use a default path for the one or more packet flows passing through the permanent anchor;
   determining, by the application server of the home network, whether the one or more packet flows between the first endpoint and the second endpoint are to be routed along the optimized path;
   removing, by the application server of the home network, the default path offer from the one or more packets if the one or more packet flows are to be routed along the optimized path;
   removing, by the application server of the home network, the optimized path offer from the one or more packets if the one or more packet flows are not to be routed along the optimized path;
   forwarding the remaining path offer for the one or more packet flows in the one or more packets from the home network to the second endpoint; and
   initiating, by a policy server of the visited network, transmission of one or more policy rules to the transient anchor if the one or more packet flows are to be routed along the optimized path, the one or more policy rules comprising one or more usage tracking rules specifying how to track usage of the visited network by the first endpoint.

2. The method of claim 1, wherein:
   the optimized path offer comprises a visited network address; and
   the default path offer comprises a home network address.

3. The method of claim 1, further comprising:
   receiving usage information from the visited network, the usage information describing usage of the visited network by the first endpoint.

4. The method of claim 1, further comprising:
   instructing a home network policy server of the home network to provide one or more policy rules to a visited network policy server of the visited network if the one or more packet flows are to be routed along the optimized path, the visited network policy server operable to provide the one or more policy rules to the transient anchor.

5. An application server of a home network, the application server operable to route a packet flow in a communication session, comprising:
   an interface operable to communicate a plurality of packets; and
   one or more processors coupled to the interface and operable to:
   facilitate a communication session between a first endpoint and a second endpoint;
   receive a plurality of path offers for one or more packet flows in one or more packets sent by the first endpoint, the plurality of path offers comprising an optimized path offer and a default path offer, the optimized path offer comprising an offer to use an optimized path for the one or more packet flows passing through a transient anchor of a visited network and bypassing a permanent anchor, the default path offer comprising an offer to use a default path for the one or more packet flows passing through the permanent anchor;
   determine, by the application server, whether the one or more packet flows between the first endpoint and the second endpoint are to be routed along the optimized path;
   remove, by the application server, the default path offer from the one or more packets if the one or more packet flows are to be routed along the optimized path;
   remove, by the application server, the optimized path offer from the one or more packets if the one or more packet flows are not to be routed along the optimized path;
   forward the remaining path offer for the one or more packet flows in the one or more packets from the home network to the second endpoint; and
   initiate, by a policy server of the visited network, transmission of one or more policy rules to the transient anchor if the one or more packet flows are to be routed along the optimized path, the one or more policy rules comprising one or more usage tracking rules specifying how to track usage of the visited network by the first endpoint.

6. The application server of claim 5, wherein:
   the optimized path offer comprises a visited network address; and
   the default path offer comprises a home network address.

7. The application server of claim 5, the one or more processors further operable to:
   receive usage information from the visited network, the usage information describing usage of the visited network by the first endpoint.

8. The application server of claim 5, the one or more processors further operable to:
   instruct a home network policy server of the home network to provide one or more policy rules to a visited network policy server of the visited network if the one or more packet flows are to be routed along the optimized path, the visited network policy server operable to provide the one or more policy rules to the transient anchor.

9. The application server of claim 5, wherein:
   the optimized path offer comprises a visited network address;
   the default path offer comprises a home network address; and
   the one or more processors further operable to:
   receive usage information from the visited network, the usage information describing usage of the visited network by the first endpoint;
   initiate transmission of one or more policy rules to the transient anchor if the one or more packet flows are to be routed along the optimized path, the one or more policy rules comprising one or more routing rules specifying that one or more packet flows are to be routed along the optimized path; and
   instruct a home network policy server of the home network to provide one or more policy rules to a visited network policy server of the visited network if the one or more packet flows are to be routed along the optimized path, the visited network policy server operable to provide the one or more policy rules to the transient anchor.

10. Non-transitory computer-readable storage medium storing logic for routing a packet flow in a communication session, the logic operable to:
    facilitate a communication session between a first endpoint and a second endpoint;
    receive a plurality of path offers for one or more packet flows in one or more packets at a permanent anchor of a home network, the plurality of path offers sent by the first endpoint, the plurality of path offers comprising an optimized path offer and a default path offer, the optimized path offer comprising an offer to use an optimized path for the one or more packet flows passing through a transient anchor of a visited network and bypassing a permanent anchor, the default path offer comprising an offer to use a default path for the one or more packet flows passing through the permanent anchor;
    determine, by an application server of the home network, whether the one or more packet flows between the first endpoint and the second endpoint are to be routed along the optimized path;
    remove, by the application server of the home network, the default path offer from the one or more packets if the one or more packet flows are to be routed along the optimized path;
    remove, by the application server of the home network, the optimized path offer from the one or more packets if the one or more packet flows are not to be routed along the optimized path;
    forward the remaining path offer for the one or more packet flows in the one or more packets from the home network to the second endpoint; and
    initiate, by a policy server of the visited network, transmission of one or more policy rules to the transient anchor if the one or more packet flows are to be routed along the optimized path, the one or more policy rules comprising one or more usage tracking rules specifying how to track usage of the visited network by the first endpoint.

11. The non-transitory storage medium of claim 10, wherein:
    the optimized path offer comprises a visited network address; and
    the default path offer comprises a home network address.

12. The non-transitory storage medium of claim 10, the logic further operable to:
    receive usage information from the visited network, the usage information describing usage of the visited network by the first endpoint.

13. The non-transitory storage medium of claim 10, the logic further operable to:
    instruct a home network policy server of the home network to provide one or more policy rules to a visited network policy server of the visited network if the one or more packet flows are to be routed along the optimized path, the visited network policy server operable to provide the one or more policy rules to the transient anchor.

14. A system for routing a packet flow in a communication session, comprising:
    means for facilitating a communication session between a first endpoint and a second endpoint;
    means for receiving a plurality of path offers for one or more packet flows in one or more packets at a permanent anchor of a home network, the plurality of path offers sent by the first endpoint, the plurality of path offers comprising an optimized path offer and a default path offer, the optimized path offer comprising an offer to use an optimized path for the one or more packet flows passing through a transient anchor of a visited network and bypassing a permanent anchor, the default path offer comprising an offer to use a default path for the one or more packet flows passing through the permanent anchor;
    means for determining, by an application server of the home network, whether the one or more packet flows between the first endpoint and the second are to be routed along the optimized path;
    means for removing, by an application server of the home network, the default path offer from the one or more packets if the one or more packet flows are to be routed along the optimized path;
    means for removing, by an application server of the home network, the optimized path offer from the one or more packets if the one or more packet flows are not to be routed along the optimized path;
    means for forwarding the remaining path offer for the one or more packet flows in the one or more packets from the home network to the second endpoint; and
    means for initiating, by a policy server of the visited network, transmission of one or more policy rules to the transient anchor if the one or more packet flows are to be routed along the optimized path, the one or more policy rules comprising one or more usage tracking rules specifying how to track usage of the visited network by the first endpoint.

* * * * *